(12) United States Patent
Cha et al.

(10) Patent No.: US 11,938,066 B2
(45) Date of Patent: Mar. 26, 2024

(54) PERSONAL MOBILITY

(71) Applicants: Hyundai Motor Company, Seoul (KR); Kia Corporation, Seoul (KR)

(72) Inventors: Dong Eun Cha, Hwaseong-si (KR); Jin Ho Hwang, Cheonan-si (KR); Sang Heon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 423 days.

(21) Appl. No.: 17/335,692

(22) Filed: Jun. 1, 2021

(65) Prior Publication Data

US 2021/0393455 A1 Dec. 23, 2021

(30) Foreign Application Priority Data

Jun. 19, 2020 (KR) .................. 10-2020-0075113

(51) Int. Cl.
| | | |
|---|---|---|
| *A61G 3/02* | (2006.01) | |
| *A61G 3/08* | (2006.01) | |
| *B60R 9/06* | (2006.01) | |
| *B62B 5/00* | (2006.01) | |

(52) U.S. Cl.
CPC ......... *A61G 3/0209* (2013.01); *A61G 3/0808* (2013.01); *B60R 9/06* (2013.01); *B62B 5/0079* (2013.01); *B62B 5/0033* (2013.01)

(58) Field of Classification Search
CPC ...... A61G 3/0209; A61G 3/0808; B60R 9/06; B62B 5/0079; B62B 5/0033; B60L 53/20; B60L 53/22; B60L 53/24; B60L 1/006; B60P 3/07

See application file for complete search history.

(56) References Cited

U.S. PATENT DOCUMENTS

| | | | | |
|---|---|---|---|---|
| 8,322,478 B2* | 12/2012 | Kim | ...................... | B62K 11/007 |
| | | | | 180/218 |
| 9,902,452 B2* | 2/2018 | Gerhardt | ................ | B62K 21/16 |
| 10,232,792 B2 | 3/2019 | Egan | | |
| 10,369,919 B2* | 8/2019 | Van Bebber | ............. | B60K 6/52 |
| 11,377,015 B2* | 7/2022 | Outoukian | ................ | B60P 3/07 |
| 11,481,695 B2* | 10/2022 | Nagata | ................... | G08G 1/123 |
| 2019/0248439 A1* | 8/2019 | Wang | ..................... | B62K 11/10 |
| 2022/0111749 A1* | 4/2022 | Adegbile | ................ | B60L 53/16 |

FOREIGN PATENT DOCUMENTS

| | | |
|---|---|---|
| CN | 108909920 | 11/2018 |
| CN | 109131662 | 1/2019 |
| DE | 10 2019 002 606 A1 | 10/2019 |
| JP | 2019-506330 A | 3/2019 |
| KR | 10-2014-0036549 | 3/2014 |
| KR | 10-2014-0134095 | 11/2014 |
| KR | 10-2018-0047379 | 5/2018 |
| KR | 10-2053432 B1 | 12/2019 |

* cited by examiner

*Primary Examiner* — John D Walters
(74) *Attorney, Agent, or Firm* — MORGAN, LEWIS & BOCKIUS LLP

(57) ABSTRACT

A personal mobility may include a body provided with an upper plate portion; a wheel connected to the body to be driven; and a battery provided in the body or the wheel and configured to provide driving energy to the wheel, wherein the mobility is configured to be stored in or drawn out of a vehicle, and the battery is configured to be charged or discharged in association with a high-voltage battery of the vehicle.

18 Claims, 8 Drawing Sheets

PERSONAL MOBILITY

CROSS REFERENCE TO RELATED APPLICATION

The present application claims priority to Korean Patent Application No. 10-2020-0075113 filed on Jun. 19, 2020, the entire contents of which is incorporated herein for all purposes by this reference.

BACKGROUND OF THE PRESENT INVENTION

Field of the Invention

The present invention relates to a mobility, which a user can ride in a comfortable position since a rod thereof is adjustable in length and a handle thereof is foldable and unfoldable, and which may be charged in a state where the mobility is stored in a vehicle, and transmit and receive location information to or from the vehicle.

Description of Related Art

Recently, concerns about a personal mobility, which is a transport which one person can ride, have been greatly increased. Since the mobility is not affected by traffic congestion, it is suitable for a short-distance transport, and since it is driven by electrical energy and not an internal combustion engine, it does not cause environmental pollution problems. As representative mobilities, various types of mobilities, such as segways, electric wheels, and electric kickboards, have appeared.

In general, the mobility is provided with a battery as a power source and a driving device such as a motor. Since mobility manufacturers produce mobilities having different battery voltages and current amounts, charging voltages and current thereof are also different from one another to cause difficulty in charging such different mobilities.

Due to a considerable volume of the mobility, it is not easy to store the mobility, and due to a considerable weight of the mobility, it is uncomfortable for a user to drag the mobility by force. Accordingly, if a situation in which the battery is discharged occurs during traveling, it is uncomfortable to store or transport the mobility.

Furthermore, there is a limit in utilizing the mobility as a transport for loading and transporting goods in addition to a moving means.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a mobility, which has a structure, in which a rod is inserted into a body, to minimize the volume thereof and to facilitate the storage thereof, which is configured to be stored in a vehicle and to perform wireless charging with the vehicle for simultaneous charging and storing, and which is configured to fold or unfold a handle to facilitate gripping of the handle.

According to various exemplary embodiments of the present invention to achieve the above object, a mobility may include: a body provided with an upper plate portion; a wheel connected to the body to be driven; and a battery provided in the body or the wheel and configured to provide driving energy to the wheel, wherein the mobility is configured to be stored in or drawn out of a vehicle, and the battery is configured to be charged or discharged in association with a high-voltage battery of the vehicle.

The mobility may further include a rod inserted and built in the body, wherein the completely inserted rod is not exposed to an outside of the body, and the rod is configured to be drawn out of the body by an external force for use.

The battery and a driving unit may be provided inside the body, and the driving unit may receive driving energy transferred from the battery and may drive the wheel.

In a state where the rod is completely inserted into the body, the body may be stored in a dedicated storage space separately provided in the vehicle.

The mobility may further include a controller configured to wirelessly control the wheel.

A wireless charging reception module connected to the battery may be provided in the body, and a wireless charging transmission module may be provided in the storage space of the vehicle, wherein the wireless charging transmission module is configured to supply power to the wireless charging reception module in a state where the mobility is stored in the storage space, and the wireless charging reception module charges the battery of the mobility.

The rod may be rotatably connected to the body at an adjustable angle.

The rod may include a first member having one end portion connected to the body, being adjustable in length based on a connection point with the body and being inserted into the body, and a second member connected to the other end portion of the first member and being insertable into the first member, wherein the length of the rod is adjustable by adjusting the length by which the second member is inserted into the first member.

A fixing pin may be provided on an outside of the first member and inserted into the first member and may fix the second member to fix the length of the rod.

A handle may have a structure in which a center portion of the handle is connected to the rod, and both sides thereof extend from the center portion and folded toward the center portion, so that the handle may be folded or unfolded.

The handle may include a hinge portion foldable inwardly and a gear portion including a plurality of gears provided inside the hinge portion, the hinge portion may include a first hinge portion located in the center portion of the handle and a second hinge portion and a third hinge portion located on both the sides of the handle, and the gear portion may include a first gear portion provided inside the first hinge portion, a second gear portion provided inside the second hinge portion, and a third gear portion provided inside the third hinge portion.

A stopper may be provided on an internal surface of the body and fix goods loaded on the upper plate portion.

The mobility may further include: a Global Positioning System (GPS) configured to receive location information related to the mobility; a first receiver connected to the GPS and configured to receive the location information from the GPS; a first transmitter connected to the first receiver and configured to transmit the location information; and the controller connected to the first transmitter and configured to receive the location information from the first transmitter.

In a state where the rod is completely inserted into the body, the body may be stored in the dedicated storage space separately provided in the vehicle, the storage space may have a door configured to open or close the storage space, the first transmitter may transmit the location information to the vehicle, and the first receiver may receive information on whether to open or close the door.

Since the mobility according to various exemplary embodiments of the present invention is configured so that the rod is configured to be completely inserted into the body and drawn out upward for use, the volume of the mobility may be minimized, and thus may be easily stored.

Since the handle is shaped to be foldable or unfoldable, a user can modify the shape of the handle for comfortable gripping, and the stopper is provided to facilitate loading of goods.

Since the mobility may be stored in the storage space of the vehicle and be wirelessly charged simultaneously with being stored, it is easy to maintain the charging amount of the battery, and the controller which may be carried by a user is provided to enable a radio control. Furthermore, since the location information is displayed on the controller, the user can easily grasp the current location of the mobility.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
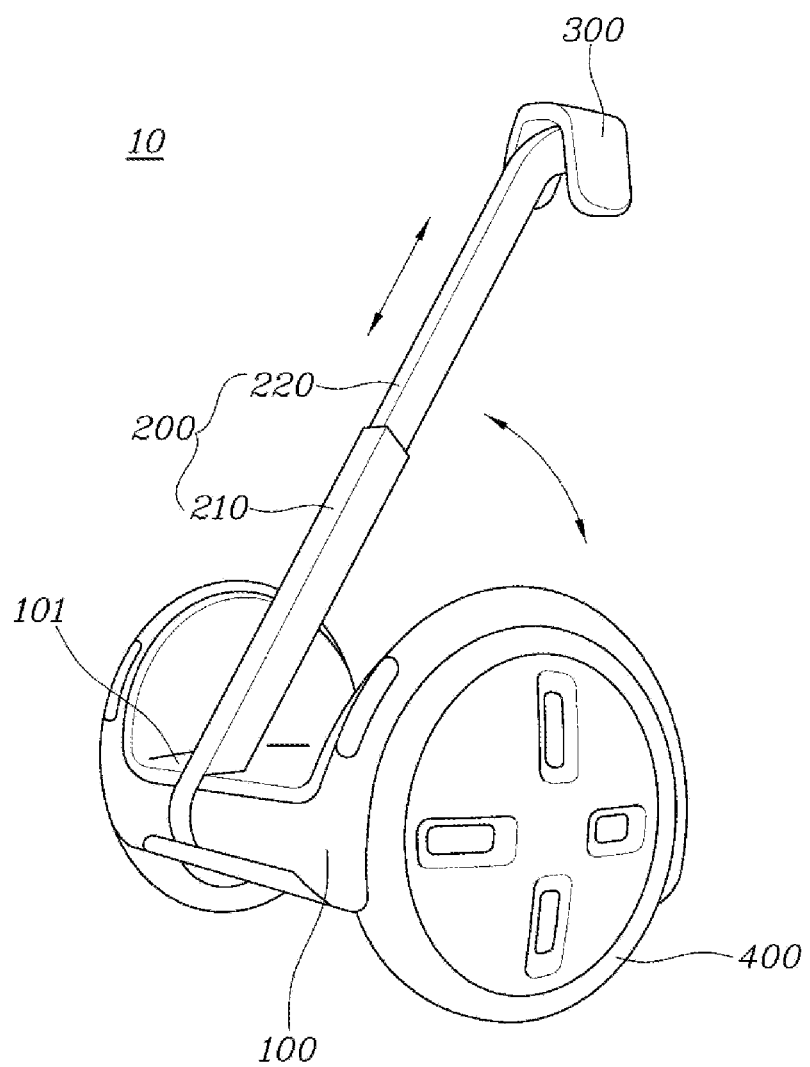
FIG. 1 is a perspective view of a mobility according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional explanations on embodiments of the present invention included in the exemplary embodiment or application are merely exemplified for explaining the exemplary embodiments of the present invention, and the exemplary embodiments according to various exemplary embodiments of the present invention may be conducted in various forms, and may not be interpreted to be limited to the exemplary embodiments described in the exemplary embodiment or application.

Since embodiments according to various exemplary embodiments of the present invention may be variously modified and may have various forms, specific embodiments will be exemplified in the drawings and will be described in detail in the exemplary embodiment or application. However, it may be understood that the exemplary embodiments according to the concept of the present invention are not limited to the specific included forms, but include all modifications, equivalents, or alternatives that are included in the idea and technical scope of the present invention.

The terms, such as "first and/or second", may be used to describe a plurality of constituent elements, but the constituent elements may not be limited by the terms. The terms are only for discriminating one constituent element from another constituent element, and for example, without departing from the scope according to the concept of the present invention, a first constituent element may be called a second constituent element, and the second constituent element may be called the first constituent element in a similar manner.

It may be understood that if a certain constituent element is mentioned to be "connected" or "coupled" to another constituent element, it includes both a case that the certain constituent element is directly connected or coupled to the another constituent element and a case that the certain constituent element is connected or coupled to the another constituent element via yet another constituent element. In contrast, if a certain constituent element is mentioned to be "directly connected or coupled" to another constituent element, it may be understood that the certain constituent element is connected or coupled to another constituent element without intervention of any other constituent element. Other expressions for explaining the relationship between the constituent elements, that is, "between" and "just between" or "neighboring" and "directly neighboring" may be interpreted in the same manner.

Hereinafter, the present invention will be described in detail through DETAILED DESCRIPTION of the present invention with reference to the accompanying drawings. The same reference numerals provided in the respective drawings denote the same members.

The present invention relates to a mobility 10 that a user can use for a short-distance travel. The mobility 10 is conveniently configured such that it may be stored in a storage space 22 of a vehicle 20 and when stored, a mobility battery 110 may be charged through a high-voltage battery of the vehicle.

FIG. 1 is a perspective view of the mobility 10 according to various exemplary embodiments of the present invention. The mobility 10 according to various exemplary embodiments of the present invention may include a body 100, a rod 200, a handle 300, and a wheel 400.

The body 100 may be provided with an upper plate portion 101 on which a user puts his or her feet for riding the mobility 10. The upper plate portion 101 can serve as a footboard for supporting the feet of the user when the user rides the mobility. The body 100 may include a rigid material so that it can bear the user's weight and it is not damaged by an external impact. Furthermore, the battery 110 that provides driving energy may be built in the body 100. The battery 110 can drive a driving unit 410 connected to the wheel 400.

The rod 200 may perform a function of allowing the user to maintain his or her balance while gripping the handle 300 during traveling. The rod 200 may be inserted and built in the body 100. When the rod 200 is completely inserted into the body 100, the rod 200 is not exposed to an outside of the body 100, and the rod 200 may be drawn upwards from the body 100 for use.

The rod 200 may have a structure extendable in a multi-stage manner so that the length of the rod 200 may be adjusted in a top-to-bottom direction thereof.

In an exemplary embodiment of the present invention, the multi-stage manner includes telescopic structure to extend the rod 200 in at least one stage or more.

Referring to FIG. 1, the rod 200 may include a first member 210 and a second member 220. The first member 210 may have one end portion connected to the body 100 and may be adjusted in length based on a connection point with the body 100. That is, after the second member 220 is inserted into the first member 210, the first member 210 is rotated and received in the body 100 so that the first member 210 may be completely inserted into the body 100.

The second member 220 may be connected to the other end portion of the first member 210 and may be inserted into the first member 210. The user can adjust the whole length of the rod 200 by adjusting the length by which the second member 220 is inserted into the first member 210. Thus, the user can adjust the length of the rod 200 to a height suitable for the height of the user.

Furthermore, the rod 200 may be positioned at a predetermined angle by rotating the first member 210. Accordingly, the user may selectively adjust the angle formed between the body 100 and the rod 200. Since the angle of the rod 200 may be changed depending on the user's body structure or riding posture, the user can ride the mobility 10 in the most comfortable position.

In an exemplary embodiment of the present invention, the body 100 may include a locking device to lock the rod 200 to the body 100 with the predetermined angle. In an exemplary embodiment of the present invention, the state in which the first member 210 is completely inserted into the body 100 includes a state in which the first member 210 is rotated to and folded on the body 100 so that the rod 200 is positioned in a radius of the wheel 400.

In another exemplary embodiment of the present invention, the second member 220 is formed in plural to be extendable in telescopic manner.

The handle 300 may be provided at an end portion of the rod 200. During traveling, the user may maintain his or her balance by gripping the handle 300, and may adjust the traveling direction by adjusting the center of gravity being applied to the handle 300.

The wheel 400 is a kind of transport, and may be connected to the body 100. The wheel 400 may perform the traveling by being driven and rotated by the driving unit built in the body 100.

Figure 2:
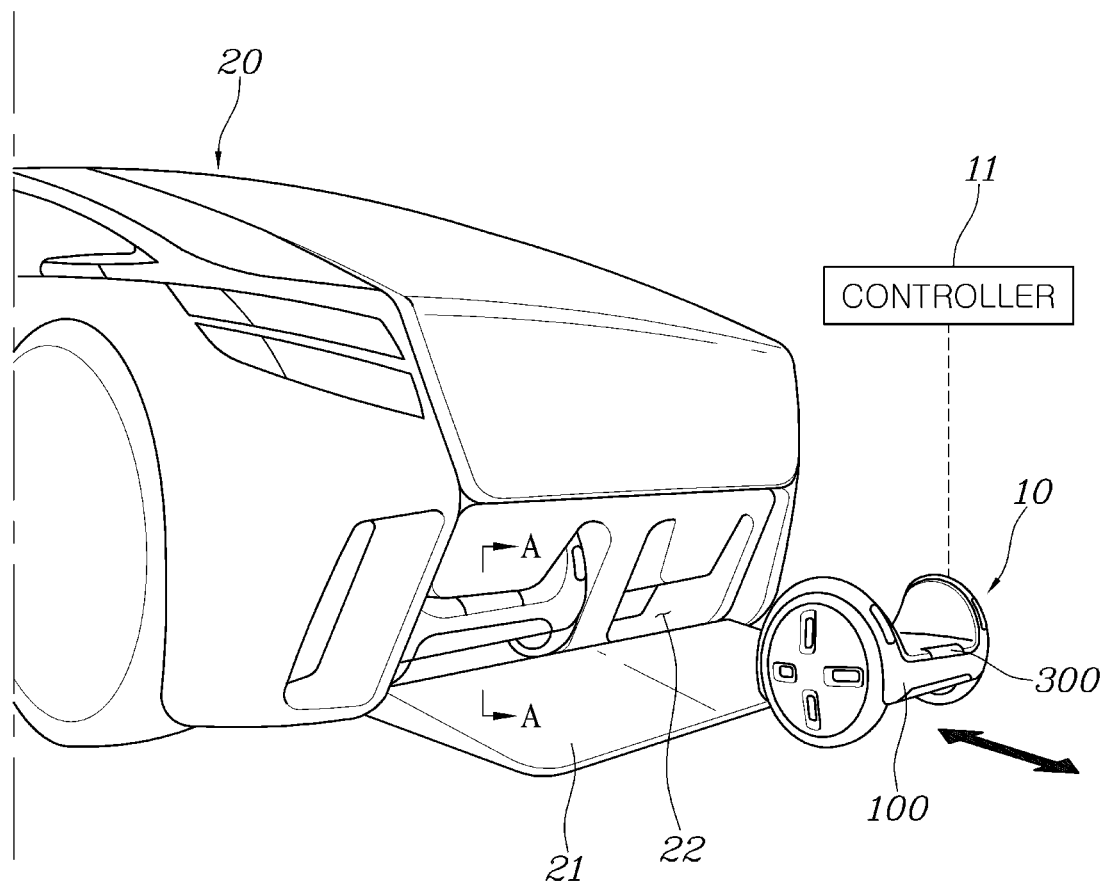
FIG. 2 is a view exemplarily illustrating a state where the mobility according to various exemplary embodiments of the present invention is stored in or drawn out of a storage space of a vehicle.

FIG. 2 is a view exemplarily illustrating a state where the mobility 10 according to various exemplary embodiments of the present invention is stored in or drawn out of the storage space 22 of the vehicle 20. Referring to FIG. 2, the vehicle 20 may have the storage space 22, in which the mobility 10 according to various exemplary embodiments of the present invention may be stored. The storage space 22 may be provided in a front or rear bumper of the vehicle 20. The storage space 22 may be opened or closed by a door 21.

The mobility 10 according to various exemplary embodiments of the present invention may further include a controller 11 configured for wirelessly controlling the wheel 400. An operation of putting or drawing the mobility 10 in or out of the storage space 22 may be controlled by the controller 11. The door 21 may be configured to open or close the storage space 22, and when the storage space 22 is open, the door 21 may be located between the storage space 22 and ground to form a path between the mobility 10 and the storage space 22.

Figure 3:
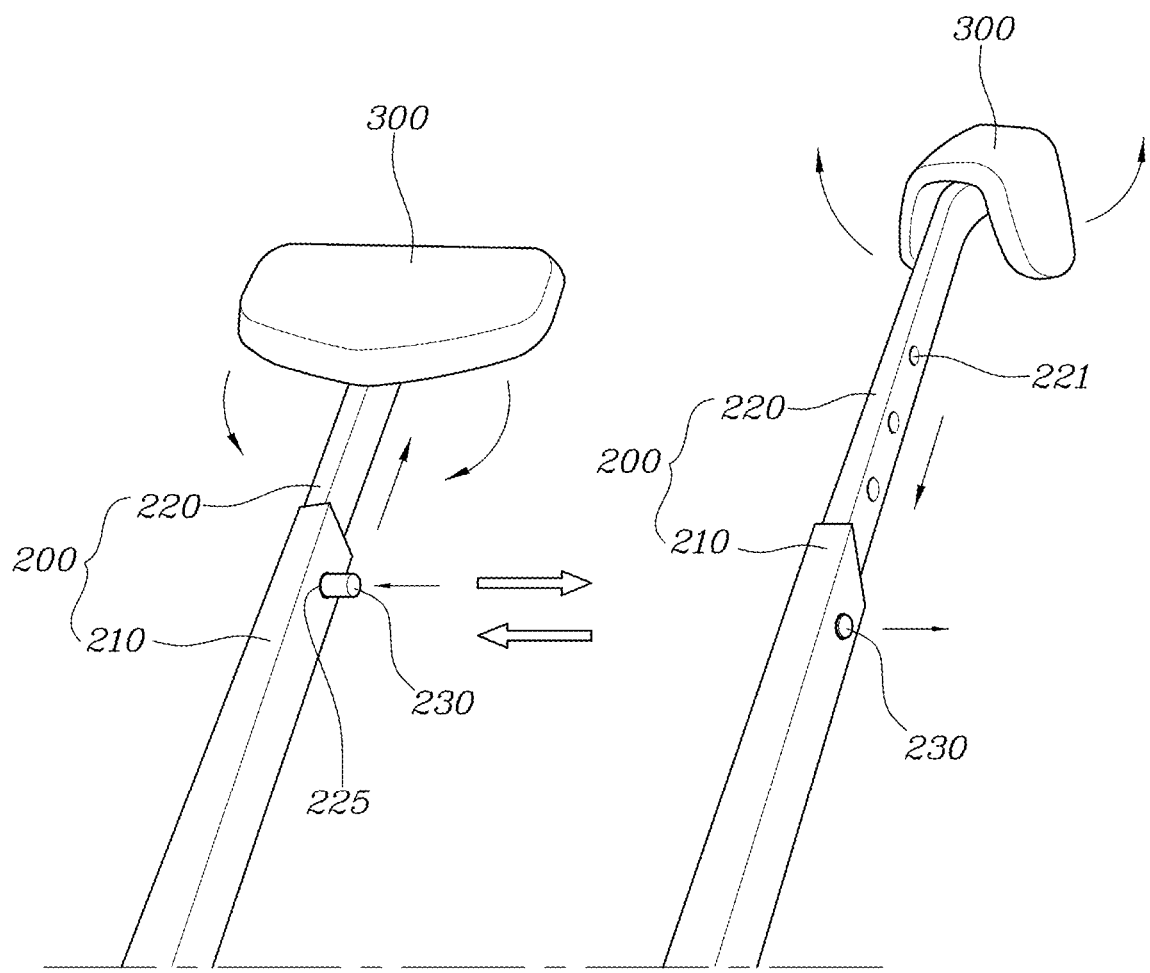
FIG. 3 is a view exemplarily illustrating movement of a rod and a handle of the mobility according to various exemplary embodiments of the present invention.

FIG. 3 is a view exemplarily illustrating movement of the rod 200 and the handle 300 of the mobility 10 according to various exemplary embodiments of the present invention.

Referring to FIG. 3, a fixing pin 230 may be provided on an outside of the first member 210 and inserted into inside of the first member 210 through a through hole 225 of the first member. The location of the second member 220 may be fixed by inserting the fixing pin 230 into the first member 210 in a state where the insertion length of the second member 220 is adjusted. On one side surface of the second member 220, a plurality of holes 221, into which the fixing pin 230 may be inserted, may be formed at predetermined intervals. The user can adjust the whole length of the rod 200 by adjusting the length by which the second member 220 is inserted into the first member 210 and fixing the rod 200 at the position suitable for the height of the user.

Referring to FIG. 3, the handle 300 may have a structure in which the center portion of the handle 300 is connected to the rod 200 and both sides thereof extend from the center portion. Both the sides of the handle 300 may be folded toward the center portion. Accordingly, the handle 300 may be configured to be folded or unfolded.

Figure 4:
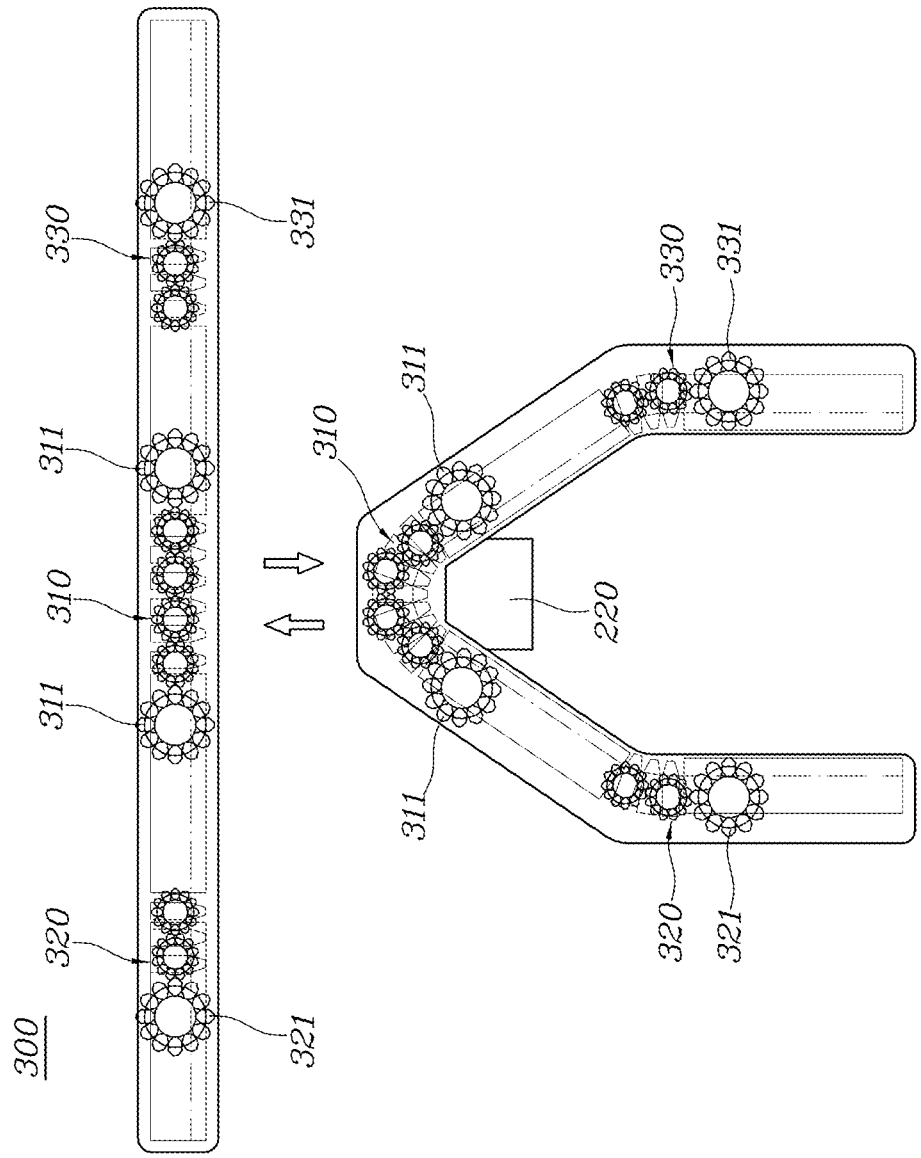
FIG. 4 is a view exemplarily illustrating an interior of the handle of the mobility according to various exemplary embodiments of the present invention.

FIG. 4 is a view exemplarily illustrating an interior of the handle 300 of the mobility 10 according to various exemplary embodiments of the present invention. Referring to FIG. 4, the inside of the handle 300 may be provided with a hinge portion having a hinge structure and folded inwardly or unfolded outwardly and a gear portion including a plurality of gears provided inside the hinge portion.

The hinge portion may include a first hinge portion 310 located in the center portion of the handle 300 and a second hinge portion 320 and a third hinge portion 330 located on both the sides of the handle 300.

The gear portion may include a first gear portion 311 provided inside the first hinge portion 310, a second gear portion 321 provided inside the second hinge portion 320, and a third gear portion 331 provided inside the third hinge portion 330.

If the user folds the handle 300 by applying an external force thereto, the first hinge portion 310, the second hinge portion 320, and the third hinge portion 330 are bent, and thus the first gear portion 311, the second gear portion 321, and the third gear portion 331 are rotated. As the gear portion is rotated by the external force applied by the user, the folded state may be maintained. Since the user can use the mobility 10 by gripping the handle 300 with the handle 300 folded, the user can feel a comfortable gripping.

The coating of the handle 300 may include a flexible material. Accordingly, even if the handle 300 is folded or unfolded, it may not be damaged.

Figure 5:
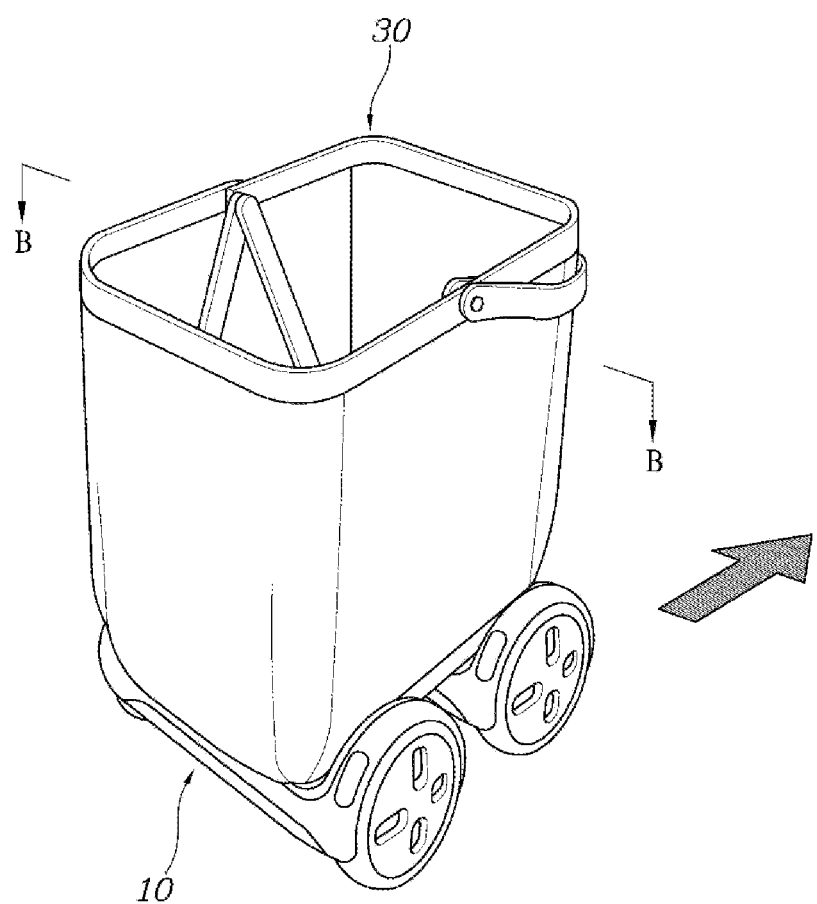
FIG. 5 is a view exemplarily illustrating a state where the mobility according to various exemplary embodiments of the present invention is used as a cart.

FIG. 5 is a view exemplarily illustrating a state where the mobility 10 according to various exemplary embodiments of the present invention is used as a cart. Referring to FIG. 5, one or more mobilities 10 may be placed side by side, and a basket 30 may be connected onto the upper plate portions 101, which makes it possible for the mobilities 10 to be used as a cart. A plurality of mobilities 10 may be provided in accordance with the size of the basket 30. By moving the mobilities 10 in a state where not only the basket 30 but also various goods are loaded, the mobilities 10 may be used as the cart.

Figure 6:
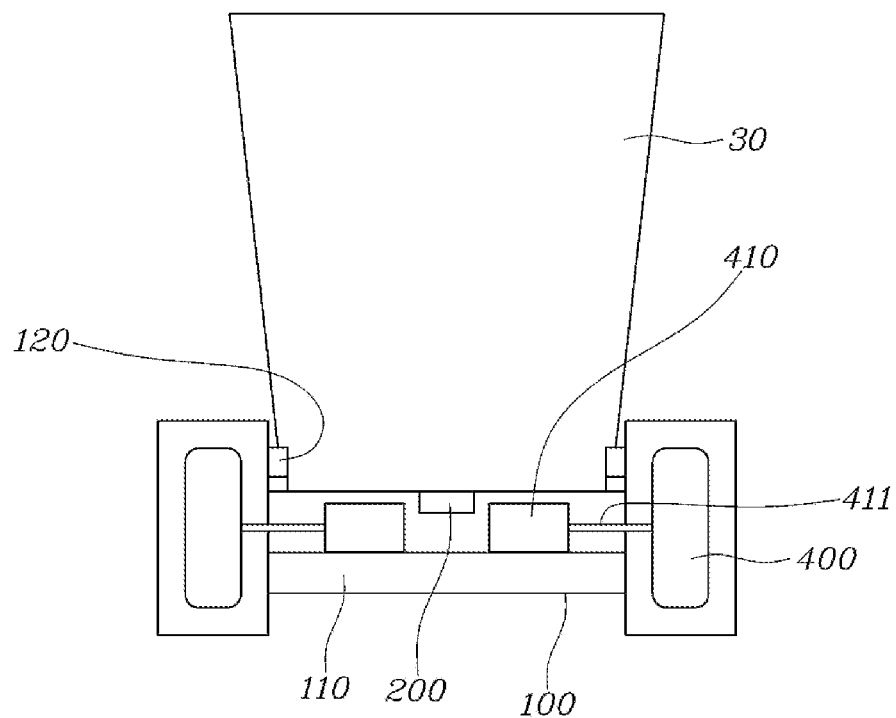
FIG. 6 is a view exemplarily illustrating an area B of FIG. 5.

FIG. 6 is a view exemplarily illustrating an area B of FIG. 5. Referring to FIG. 6, a stopper 120 may be provided on an internal surface of the body 100 and fix goods loaded on the upper plate portion 101. The stopper 120 may project from the internal surface and fix the loaded goods, preventing the goods from separating from the upper plate portion 101 during movement.

As illustrated in FIG. 6, the battery 110 and the driving unit 410 may be provided inside the body 100. The driving unit 410 may be connected to the wheel 400 by a shaft 411. The mobility 10 can move as the driving unit 410 drives the wheel using the driving energy stored in the battery 110.

Figure 7:
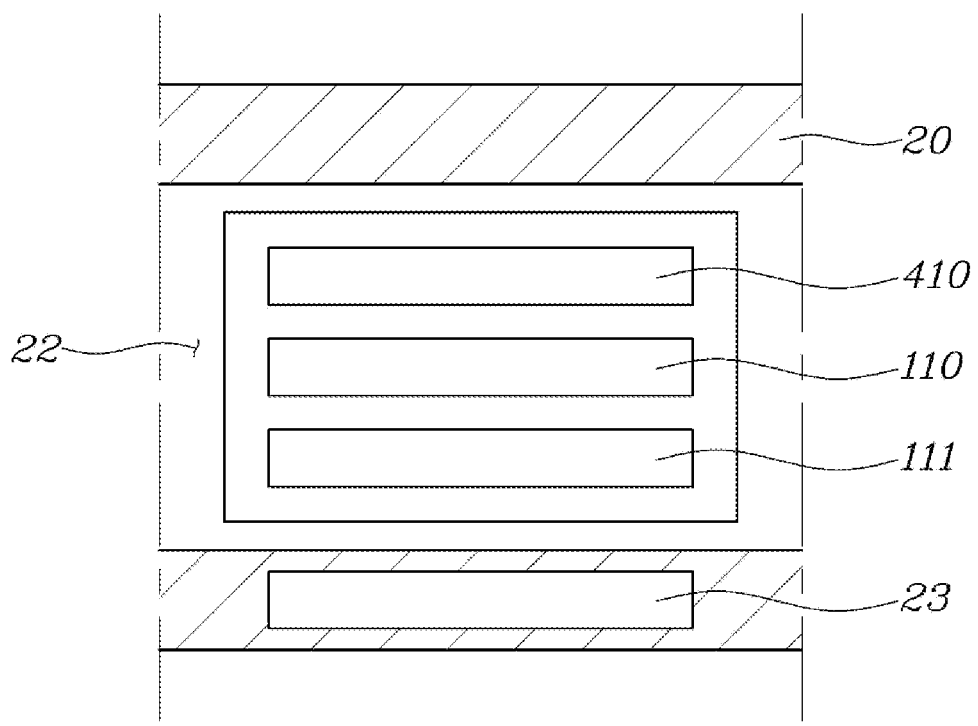
FIG. 7 is a view exemplarily illustrating an area of FIG. 2.

FIG. 7 is a view exemplarily illustrating an area of FIG. 2. Referring to FIG. 7, the mobility 10 according to various exemplary embodiments of the present invention may include a wireless charging reception unit 111 provided in the body 100.

The wireless charging reception unit 111 connected to the battery 110 may be provided in the body 100, and a wireless charging transmission unit 23 may be provided in the storage space 22. In a state where the mobility 10 is stored in the storage space 22, the wireless charging transmission unit 23 may supply power to the wireless charging reception unit 111, and the wireless charging reception unit 111 may receive the power. The wireless charging reception unit 111 may be provided with a reception coil that receives a power signal. The wireless charging reception unit 111 may charge the battery 110 with the supplied power. In case that the mobility 10 is not in use, it may be stored in the storage space 22, and at the same time, the battery 110 of the mobility may be charged through the high-voltage battery of the vehicle.

Figure 8:
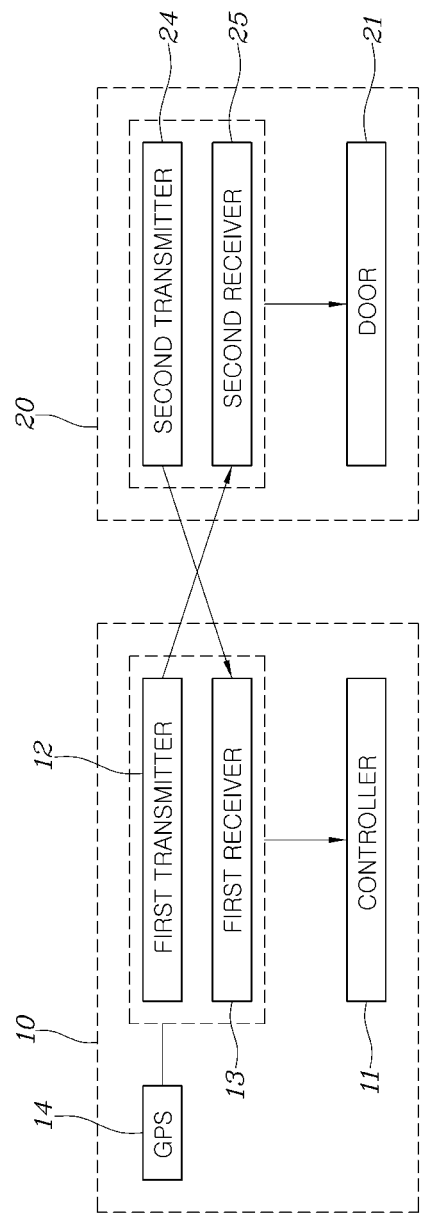
FIG. 8 is a diagram explaining a communication relationship between the mobility according to various exemplary embodiments of the present invention and a vehicle.

FIG. 8 is a diagram explaining a communication relationship between the mobility 10 according to various exemplary embodiments of the present invention and the vehicle 20. Referring to FIG. 8, the mobility 10 according to various exemplary embodiments of the present invention may further include a GPS 14 configured to receive location information, a first receiver 13 configured to receive the location information from the GPS 14; a first transmitter 12 configured to transmit the location information; and the controller 11 configured to receive the location information from the first transmitter 12.

In case that a user cannot find the mobility 10 which is placed in a specific location, the user needs to identify the location. The GPS 14 may grasp the current location information related to the mobility 10, and the first receiver 13 may receive the corresponding location information. The first transmitter 12 may transmit the corresponding location information to the controller 11, and the user can identify the current location information related to the mobility 10 by the controller 11 carried by the user.

Furthermore, in the vehicle 20 in which the mobility 10 is stored, a second transmitter 24 and a second receiver 25 may be provided. The first transmitter 12 may transmit the location information related to the mobility 10 to the second receiver 25, and the second receiver 25 may receive the location information. If it is determined that the mobility 10 is nearby, the second transmitter 24 may transmit a signal to open the door 21, and the door 21 may be automatically open upon the reception of the signal.

Furthermore, the second transmitter 24 may transmit information on whether to open or close the door 21 to the first receiver 13. The first receiver 13 may receive the information on whether to open or close the door 21, and the first transmitter 12 may transmit the corresponding information to the controller 11. The user can identify the opening of the door 21, and then can store the mobility in the storage space 22.

Furthermore, the term related to a control device such as "controller", "control unit", "control device" or "control module", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A mobility vehicle comprising:
   a body provided with an upper plate portion;
   a wheel connected to the body to be driven; and
   a battery provided in the body or the wheel and configured to provide driving energy to the wheel,
   wherein the mobility vehicle is configured to be stored in or drawn out of a vehicle,
   wherein the battery is configured to be charged or discharged in association with a battery of the vehicle, and
   wherein a stopper is provided on an internal surface of the body and configured to fix goods loaded on the upper plate portion.

2. The mobility vehicle according to claim 1, further including a rod built in the body,
   wherein when the rod is inserted into the body, the rod is configured to be drawn out of the body by an external force for use.

3. The mobility vehicle according to claim 2, wherein when the rod is completely inserted in the body, the rod is not exposed to an outside of the body.

4. The mobility vehicle according to claim 2, wherein in a state where the rod is inserted into the body, the body is configured to be stored in a dedicated storage space separately provided in the vehicle.

5. The mobility vehicle according to claim 2, wherein the rod is rotatably connected to the body at a predetermined adjustable angle.

6. The mobility vehicle according to claim 2,
   wherein the rod includes a first member having a first end portion connected to the body, being adjustable in length according to a connection point with the body and being inserted into the body, and a second member connected to a second end portion of the first member and being insertable into the first member, and
   wherein a length of the rod is adjustable by adjusting a length of the second member by inserting a portion of the second member into the first member.

7. The mobility vehicle according to claim 6,
   wherein the second member includes a plurality of holes, and
   wherein the first member includes a through hole and a fixing pin provided on an outside of the first member, the fixing pin configured to be inserted into the through hole of the first member and one of the plurality of the holes to fix the second member to the first member so as to fix the length of the rod.

8. The mobility vehicle according to claim 6, wherein the second member is formed in plural to be telescopically movable.

9. The mobility vehicle according to claim 1, wherein the battery and a driving unit of the mobility vehicle are provided inside the body, and the driving unit receives the driving energy transferred from the battery of the mobility vehicle and drives the wheel by the driving energy.

10. The mobility vehicle according to claim 1, further including a controller including a processor configured to wirelessly control the wheel.

11. The mobility vehicle according to claim 1,
    wherein a wireless charging reception module connected to the battery of the mobility vehicle is provided in the body, and
    wherein the wireless charging reception module is configured to receive power from a wireless charging transmission module provided in a storage space of the vehicle and to charge the battery of the mobility vehicle while the mobility vehicle is stored in the storage space.

12. The mobility vehicle according to claim 1,
    wherein a handle is provided at an end portion of a rod, and a center portion of the handle is connected to the end portion of the rod, and a first end portion and a second end portion of the handle extend from the center portion to first and second sides of the handle, respectively.

13. The mobility vehicle according to claim 12,
    wherein the first end portion and the second end portion of the handle are foldable with respect to the center portion.

14. The mobility vehicle according to claim 13,
    wherein the handle includes a hinge portion foldable in a predetermined direction and a gear portion including a plurality of gears provided inside the hinge portion,
    wherein the hinge portion includes a first hinge portion located in the center portion of the handle and a second hinge portion and a third hinge portion located on the first and second sides of the handle, respectively, and
    wherein the gear portion includes a first gear portion provided inside the first hinge portion, a second gear portion provided inside the second hinge portion, and a third gear portion provided inside the third hinge portion.

15. The mobility vehicle according to claim 14,
    wherein the first gear portion includes even number of gears among the plurality of gears, and
    wherein the second and third gear portions includes odd number of gears, respectively, among the plurality of gears.

16. The mobility vehicle according to claim 1, further including:
    a Global Positioning System (GPS) configured to receive location information related to the mobility vehicle;
    a first receiver connected to the GPS and configured to receive the location information related to the mobility vehicle from the GPS;
    a first transmitter connected to the first receiver and configured to transmit the location information related to the mobility vehicle; and
    a controller connected to the first transmitter and configured to receive the location information related to the mobility vehicle from the first transmitter.

17. The mobility vehicle according to claim 16,
    wherein in a state where a rod is inserted into the body, the body is stored in a storage space separately provided in the vehicle, and the storage space has a door configured to open or close the storage space, and the first transmitter transmits the location information related to the mobility vehicle to the vehicle, and the first receiver receives information on whether to open or close the door, from the vehicle.

18. The vehicle according to claim 16, comprising:

a storage space having a door;

a second receiver configured to receive the location information related to the mobility vehicle, from the first transmitter, a second transmitter configured to transmit a signal to the vehicle to open the door of the storage space when the mobility vehicle is located in a predetermined distance from the vehicle, so that the mobility vehicle is stored in the storage space.

* * * * *